(12) United States Patent
Mayuzumi

(10) Patent No.: US 7,443,660 B2
(45) Date of Patent: Oct. 28, 2008

(54) INFORMATION PROCESSING APPARATUS IN WHICH A STORAGE MEDIUM IS REMOVABLY MOUNTABLE

(75) Inventor: Ichiko Mayuzumi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 975 days.

(21) Appl. No.: 10/836,007

(22) Filed: Apr. 29, 2004

(65) Prior Publication Data

US 2004/0240168 A1 Dec. 2, 2004

(30) Foreign Application Priority Data

May 26, 2003 (JP) .............................. 2003/147844

(51) Int. Cl.
*H05K 7/20* (2006.01)
*G06F 1/16* (2006.01)

(52) U.S. Cl. ................... 361/683; 361/687; 361/685; 361/683; 361/726; 312/223.2; 307/112; 700/79; 710/304

(58) Field of Classification Search ........... 361/678, 361/679, 683–689, 724–732; 312/219, 223.1–223.3, 312/324; 307/112, 116, 64–66; 340/310.08, 340/521, 825.26, 825.3, 825.34, 895.31; 29/832; 70/263, 277, 278, 266; 16/230, 16/232, 231, 229
See application file for complete search history.

(56) References Cited

U.S. PATENT DOCUMENTS

| | | | | |
|---|---|---|---|---|
| 5,172,967 A * | 12/1992 | Pipe ............................ 312/217 |
| 5,479,341 A * | 12/1995 | Pihl et al. ...................... 700/79 |
| 5,555,156 A * | 9/1996 | Decante ....................... 361/683 |
| 5,781,408 A * | 7/1998 | Crane et al. .................. 361/683 |
| 5,805,074 A * | 9/1998 | Warren et al. ............... 340/5.54 |
| 5,875,063 A * | 2/1999 | Corrington et al. ............ 360/71 |
| 6,034,926 A * | 3/2000 | Dang et al. ............... 369/30.34 |
| 6,108,188 A * | 8/2000 | Denison et al. ............. 361/160 |
| 6,271,604 B1 * | 8/2001 | Frank et al. .................. 307/112 |
| 6,307,738 B1 * | 10/2001 | Tran et al. .................... 361/683 |
| 6,529,382 B2 * | 3/2003 | Terao .......................... 361/726 |
| 6,549,969 B1 * | 4/2003 | Hsu et al. .................... 710/304 |
| 6,819,558 B2 * | 11/2004 | Shih ........................... 361/687 |

FOREIGN PATENT DOCUMENTS

JP 2002-373030 A 12/2002

OTHER PUBLICATIONS

The Article: "Security Mechanism", IBM Technical Disclosure Bulletin, May 1969, vol. 11; Issue 12; pp. 1773-1775.*

* cited by examiner

*Primary Examiner*—Michael V Datskovskiy
(74) *Attorney, Agent, or Firm*—Canon U.S.A. Inc I.P. Div

(57) ABSTRACT

An information processing apparatus, which is capable of improving security and operationality in handling of storage media, includes a system bay and a data bay that are provided on the main body of the information processing apparatus and allow respective disks to be removably mounted therein, and a second control portion that controls the system bay and the data bay. The second control portion controls the system bay and the data bay in such a way as to prevent the disks from being removed from the system bay and the data bay when the disks have been mounted in the system bay and the data bay.

15 Claims, 9 Drawing Sheets

INFORMATION PROCESSING APPARATUS IN WHICH A STORAGE MEDIUM IS REMOVABLY MOUNTABLE

BACKGROUND OF THE INVENTION

1. Field of the Invention

The present invention relates to an information processing apparatus in which a storage medium is removably mountable, and more particularly to an information processing apparatus designed with security taken into consideration.

2. Description of Related Art

In recent years, with advancements in storage capacity of computer storage media, such as hard disk drives, there has been a desire to improve reliability, operationality and security of the storage media.

For example, one data storage method with improved reliability is known as RAID (Redundant Array of Inexpensive Disks) structure in which data is distributed among two or more hard disks so as to decrease failure rate.

Also, one storage medium on the market with improved operationality is a "removable disk" which has dramatically improved exchangeability of the disk.

In addition to hard disks, other types of storage media on the market having improved operationality include writable DVD's (Digital Versatile/Video Disc), writable CD's (Compact Disc), CF (Compact Flash) cards and SD (Secure Digital) cards.

However, the improvements mentioned above have not only made handling of storage media more easy for its owner, but also for anyone else. As such, there has been an increased probability that storage media might be stolen.

Heretofore, there have been proposed in "A Computer Having a Filebay Cover with an Electronic Lock and a Control Method for the Computer" (Japanese Laid-Open Patent Application No. 2000-194448) and "A Computer Having a Door with an Electronic Lock" (Japanese Laid-Open Patent Application No. 2002-373030) measures to increase security of storage media.

In Japanese Laid-Open Patent Application No. 2000-194448, a storage-medium drive unit is equipped with a bay cover covering a filebay. The bay cover includes an electronic lock for electronically controlling locking operations, which makes it unnecessary for the user to carry or manage any physical keys and leads to an improvement in security.

Similarly, Japanese Laid-Open Patent Application No. 2002-373030 discloses a cover with an electronic lock provided on a storage-medium drive unit. To improve security, the electronic lock is controlled by means of equipment having a control portion, a power source portion and a communication portion which are provided independently of the main body of the computer.

In Japanese Laid-Open Patent Application No. 2000-194448, a control portion of the main body of the computer controls the electronic lock to open and close in response to the user's operation via a network. Therefore, it is conceivable that the electronic lock mechanism may not function normally when a power source for the computer is in an off-state, when the network is in a stop state, or when power supply is cut off, which can compromise security.

In Japanese Laid-Open Patent Application No. 2002-373030, since the electronic lock is controlled by the equipment that is independent of the main body of the computer, the electronic lock can function normally regardless of the condition of the power source for the main body of the computer or the condition of the network. However, since the power source portion is provided independently of the main body of the computer, two plug outlets are required. Further, since the network communication portion is also provided independently of the main body of the computer, two IP addresses are required. Accordingly, this hardware arrangement can lead to an increase in size, thereby causing an increase in cost.

Further, in the above two references, only after the user inserts a removable storage medium into the storage-medium drive unit and performs a locking operation on the electronic lock is removal of the storage medium from the storage-medium drive unit prevented. However, in the absence of the locking operation by the user, the problem with ease in removing the storage medium remains unsolved.

Furthermore, in the above two references, there are no means for discerning the type of storage medium, such as whether the hard disk is a systems disk or a data disk. Therefore, the type of hard disk becomes known only after the hard disk starts operating upon power-up of the computer main body, insertion of the hard disk into the drive unit, and closure by the electronic lock in response to the user's operation.

If the user inserts the wrong disk type into the drive unit, since the electronic lock has been closed, it would be necessary for the user to perform an operation to open the electronic lock, which is inconvenient.

SUMMARY OF THE INVENTION

The present invention is directed to an information processing apparatus having improved security and operationality concerning handling of storage media, such as removable media. The apparatus includes a storage device capable of supporting a storage medium, and a cover for covering the storage device.

In one aspect of the present invention, the information processing apparatus includes a lock for selectively locking the cover closed, and a controller for controlling the lock to automatically lock the cover closed when power supply is turned on to the apparatus. In one embodiment, the apparatus includes a detector for detecting whether a power switch has been depressed on. Upon the detector detecting that the power switch has been depressed, the controller controls the lock to lock the cover.

In another aspect of the present invention, the information processing apparatus includes a lock for selectively locking the cover closed, and a controller for controlling the lock to automatically lock the cover when the cover is closed. In one embodiment, the apparatus includes a detector for detecting whether the cover is open or closed. Responsive to the detector detecting the cover open, the controller controls a display to display a message to close the cover. Responsive to the detector detecting the cover closed, the controller controls the lock to lock the cover.

In a further aspect of the present invention, the information processing apparatus includes a lock for selectively locking the cover closed, and a controller for controlling the lock to automatically lock the cover closed when power supply is below a predetermined level. In one embodiment, the apparatus includes a detector for detecting power level of a power supply. Responsive to detecting power level below the predetermined level, the controller controls the lock to lock the cover closed.

In a still further aspect of the present invention, the apparatus includes a discerner for discerning a type of the storage medium inserted in the storage device, a lock for selectively locking the cover, and a controller for controlling the lock to automatically lock the cover closed when a correct type of the storage medium is inserted in the storage device. In one embodiment, responsive to the discerner discerning a wrong type of storage medium, the controller controls a display to display a message to insert a correct type of the storage medium and controls the lock to unlock the cover if the cover is locked. Responsive to the discerner discerning a correct type of the storage medium, the controller controls the lock to lock the cover closed.

The above and further features and advantages of the present invention will become apparent to those skilled in the art upon reading of the following detailed description of embodiments thereof when taken in conjunction with the accompanying drawings, in which like reference characters designate the same or similar parts throughout the figures thereof.

BRIEF DESCRIPTION OF THE DRAWINGS

The accompanying drawings, which are incorporated herein and constitute a part of the specification, illustrate embodiments of the invention and, together with the description, serve to explain the principles of the invention.

DETAILED DESCRIPTION OF THE INVENTION

Embodiments of the present invention will be described in detail below with reference to the drawings.

Figure 1:
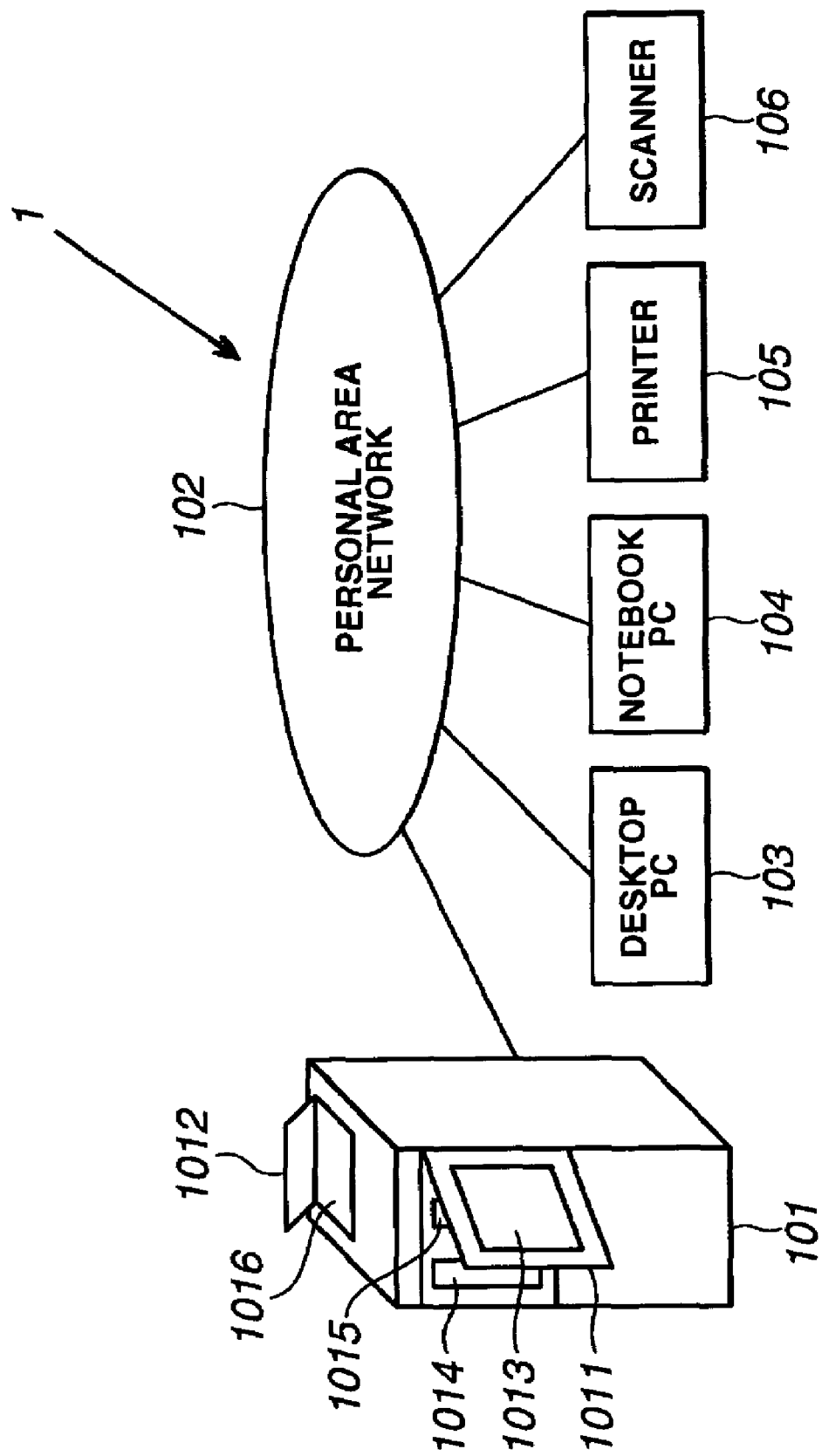
FIG. 1 is a schematic showing a system incorporating an information processing apparatus in accordance with one embodiment of the present invention.

FIG. 1 is a schematic showing a system 1 incorporating an information processing apparatus 101 in accordance with one embodiment of the present invention.

In FIG. 1, the system 1 includes the information processing apparatus, such as a server apparatus 101, coupled to a plurality of terminals via a network (personal area network) 102. The terminals can include a first PC (information terminal) 103, such as a desktop PC (personal computer), a second PC (information terminal) 104, such as a notebook PC, a printer (information terminal) 105, and a scanner (information terminal) 106.

The server apparatus 101 assigns ID's (identifiers) to users, the terminals 103 to 106, various storage media, etc., collectively manages them, encrypts all data stored therein, and performs authentication and processing operations according to information on various ID's in response to access to each data. The server apparatus 101 has a plurality of bays (storage-medium mounting portions) 1014 to 1016 that allow dedicated or general-purpose storage media to be removably mounted therein, and two covers (lids) 1011 and 1012 that cover mounting openings of the bays 1014 to 1016 in a closed or open state. Each of the covers 1011 and 1012 is arranged to be electronically locked so as to prevent a storage medium mounted in the bays 1014 to 1016 from being removed therefrom.

The cover 1011 is provided on the front side of the server apparatus 110. The cover 1011 includes a display portion 1013, such as a liquid crystal display device having a touch sensor or the like. The display portion 1013 is configured to display various items of information and to allow input of setting or other information (for example, passwords) via a touch screen.

The server apparatus 101 manages the network 102. The first PC 103, connected to the network 102, is a terminal for transmitting data to the server apparatus 101 and for accessing data stored in the server apparatus 101. The second PC 104, also connected to the network 102, is a terminal for transmitting data to the server apparatus 101 and for accessing data stored in the server apparatus 101. The printer 105, connected to the network 102, allows for printing data stored in the terminals 103 to 106 and the server apparatus 101. The scanner 106, connected to the network 102, allows for transmitting read image information to the terminals 103 to 106 and the server apparatus 101.

As will be described more fully below, the server apparatus 101 includes a first control portion for realizing the server functions, and a second control portion for managing the covers 1011 and 1012, the power source and the electronic lock on the covers 1011 and 1012. The second control portion is configured to continuously operate even if a power source for supplying power to the main body of the server apparatus 101 is in an off-state.

Figure 2:
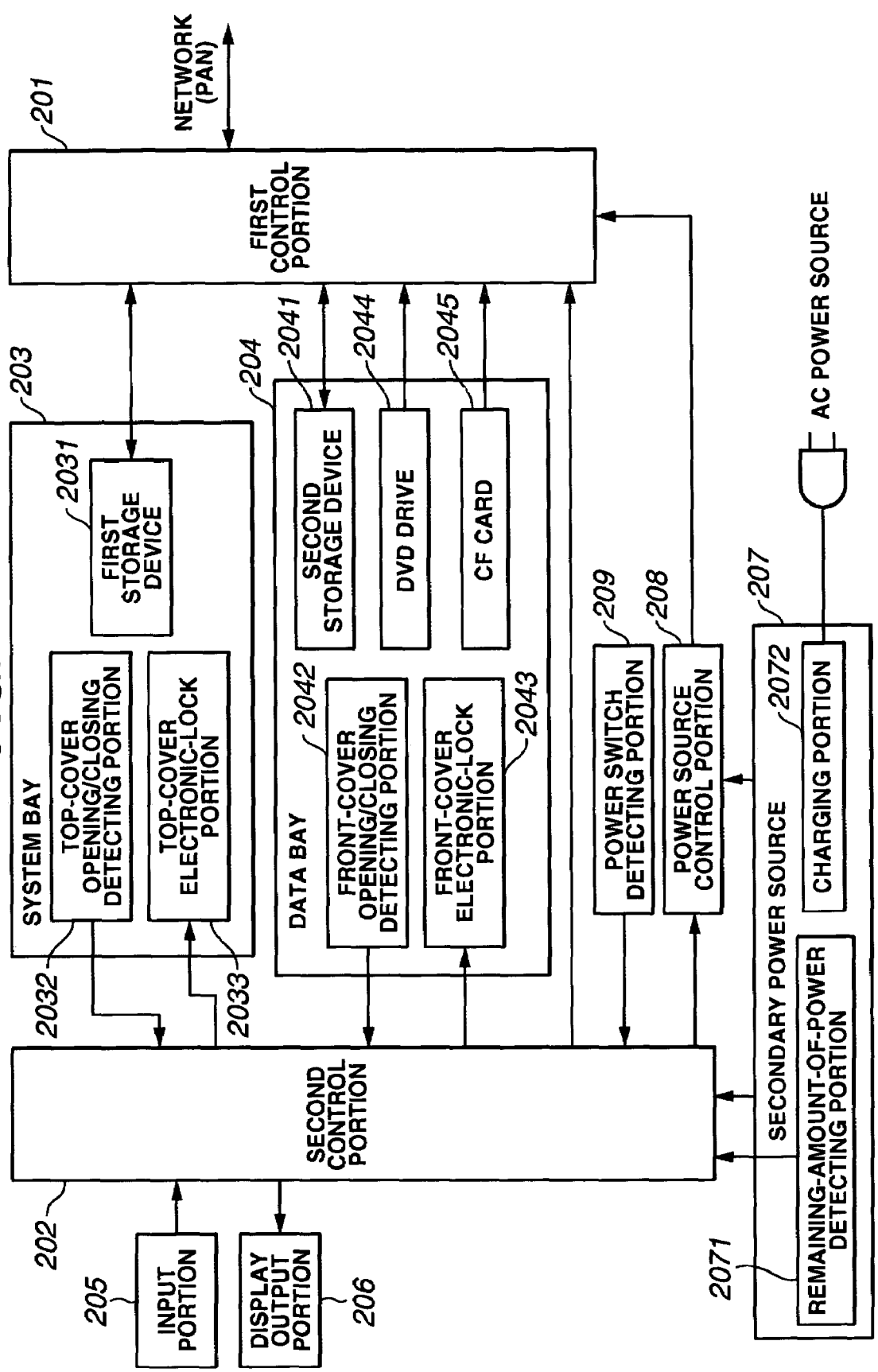
FIG. 2 is a block diagram of the components of the server apparatus according to a first embodiment of the invention.

FIG. 2 is a block diagram showing components of the server apparatus 101 in accordance with a first embodiment.

The server apparatus 101 includes a first control portion 201, a second control portion 202, a system bay 203 (corresponding to the bay 1016 in FIG. 1), a data bay 204 (corresponding to the bays 1014 and 1015 in FIG. 1), an input portion 205, such as a touch-panel type input portion or the like, a display output portion 206 (corresponding to the display portion 1013 in FIG. 1), a secondary power source 207, a power source control portion 208, and a power switch detecting portion 209.

The first control portion 201 includes a CPU (central processing unit), a memory, and peripheral components, such as network interfaces. The first control portion 201 is connected to the network 102.

The second control portion 202 includes a CPU, a memory and peripheral components, such as an input-portion driver and a display-output-portion driver.

The system bay 203, situated on the top portion of the server apparatus 101, is provided with a cover (corresponding to the cover 1012 in FIG. 1), which will be hereinafter referred to as a "top cover." The system bay 203 includes a first storage device 2031, a top-cover opening/closing detecting portion 2032 and a top-cover electronic-lock portion 2033.

The first storage device 2031 is adapted to allow a system disk (e.g., removable medium, storage medium) having stored therein an OS (operating system), application software, databases, etc. to be removably mounted therein. The first storage device 2031 has the RAID structure, in which a plurality of disks are employed. The top-cover opening/closing detecting portion 2032 is configured to detect open and closed states and events of opening and closing of the top cover 1012 so as to produce a detection signal, which is transmitted to the second control portion 202. The second control portion 202 controls the top-cover electronic-lock portion 2033 to perform locking and unlocking operations of the top cover 1012. Information indicating whether the top cover is in a locked or unlocked state is stored in a memory (not shown) of the second control portion 202.

It should be noted that, since a system disk is inserted in the first storage device 2031, the electronic lock prevents the top cover 1012 from being opened unless the power source of the main body of the server apparatus 101 is in an off-state.

The data bay 204 is provided at a front portion of the server apparatus 101. The data bay 204 also is provided with a cover (corresponding to the cover 1011 in FIG. 1), which will be hereinafter referred to as a "front cover." The data bay 204 includes a second storage device 2041, a front-cover opening/closing detecting portion 2042, a front-cover electronic-lock portion 2043, a storage-medium drive 2044, such as a DVD drive, and a storage-medium slot 2045, such as a CF card slot.

The second storage device 2041 is adapted to allow a data disk (storage medium) to be removably mounted therein. The second storage device 2041 does not employ a RAID structure. The front-cover opening/closing detecting portion 2042 is configured to detect open and closed states and events of opening and closing of the front cover 1011 so as to produce a detection signal, which is transmitted to the second control portion 202. The second control portion 202 controls the front-cover electronic-lock portion 2043 to perform locking and unlocking operations of the front cover 1011. Information indicating whether the front cover 1011 is in a locked or unlocked state is stored in the memory (not shown) of the second control portion 202. The storage-medium drive 2044 is configured to drive and control storage media, such as a DVD and CD. The storage-medium slot 2045 is adapted to allow storage media, such as a CF card, to be removably inserted therein.

The input portion 205 is provided at the front portion of the server apparatus 101. The input portion 205 allows a user to input data, such as passwords or the like. The input data from the input portion 205 is transmitted to the second control portion 202 where predetermined processing operations are performed.

Like the input portion 205, the display output portion 206 is also provided at the front portion of the server apparatus 101. The display output portion 206 is configured to display a UI (user interface) of the server apparatus 101, such as conditions of the server apparatus 101 and message outputs for the user. The second control portion 202 controls the display output portion 206 to output displayed information.

The secondary power source 207 supplies power to the main body of the server apparatus 101 during power failure or when an AC power source is cut off. The secondary power source 207 includes a remaining-amount-of-power detecting portion 2071 and a charging portion 2072. The remaining-amount-of-power detecting portion 2071 is configured to detect the remaining amount of power or power level of the secondary power source 207. The charging portion 2072 is configured to charge the secondary power source 207 by means of an AC power source.

The power source control portion 208 controls the supply of power from the secondary power source 207 to the main body of the server apparatus 101. The power source control portion 208 is controlled by the second control portion 202. It should be noted that the main body of the server apparatus 101 means the first control portion 201 and its peripheral devices, such as various storage-medium drivers, interfaces, etc.

The power switch detecting portion 209 detects depression (turned on) of a power switch (not shown) of the server apparatus 101. The power switch is for switching on/off a power source to the server apparatus 101.

Information indicating whether the power source for the server apparatus 101 is in an on-state or off-state is stored in the memory (not shown) of the second control portion 202. When the power switch detecting portion 209 detects that the power switch has been depressed, the second control portion 202 performs predetermined processing operations according to the stored information on the on/off-state of the power source.

Next, a control operation for the top-cover electronic-lock portion 2033 will be described with reference to the flow chart of FIG. 3.

Figure 3:
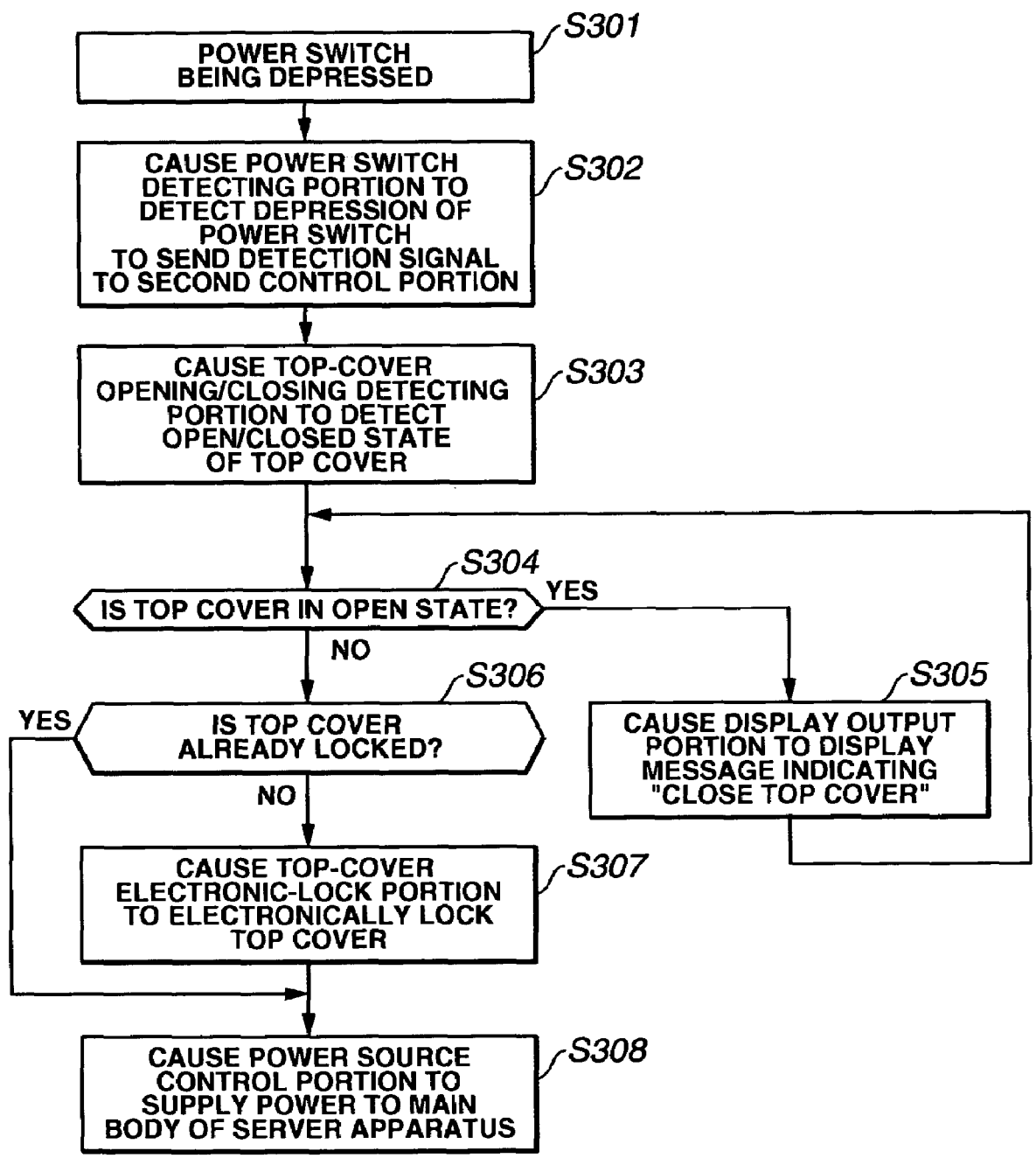
FIG. 3 is a flow chart illustrating a locking operation of a top-cover electronic-lock portion when a power source of the server apparatus shown in FIG. 2 is in an off-state.

FIG. 3 is a flow chart showing a process performed by the second control portion 202 when the user has depressed the power switch of the server apparatus 101 and the power source for the server apparatus 101 is in an off-state.

When a user depresses the power switch (step S301), the power switch detecting portion 209 detects such depression and produces a detection signal, which is then sent to the second control portion 202 (step S302). The second control portion 202 receives the detection signal from the power switch detecting portion 209 through the use of an interrupt signal and causes the top-cover opening/closing detecting portion 2032 to detect the open/closed state of the top cover 1012 (step S303) When the detection portion 2032 detects that the top cover 1012 is in an open state (step S304), the second control portion 202 causes the display output portion 206 to display a message indicating "Close Top Cover," or the like (step S305), thereby urging the user to close the top cover 1012. Then, the process flow returns to the step S304.

In cases when the user has closed the top cover or when it is detected in the step S304 that the top cover is in a closed state, the second control portion 202 loads information stored in the memory so as to determine if the top cover is already locked (step S306). If the top cover is not yet locked (i.e., the top cover is in an unlocked state), the second control portion 202 causes the top-cover electronic-lock portion 2033 to lock the top cover 1012 (step S307). After the top cover 1012 has been locked, or if it is determined in the step S306 that the top cover 1012 is already locked, the second control portion 202 causes the power source control portion 208 to supply power to the main body of the server apparatus 101 (step S308)

As described above, when the user depresses the power switch, the second control portion 202 automatically locks the top cover 1012, so that it is unnecessary for the user to lock the top cover 1012.

Figure 4:
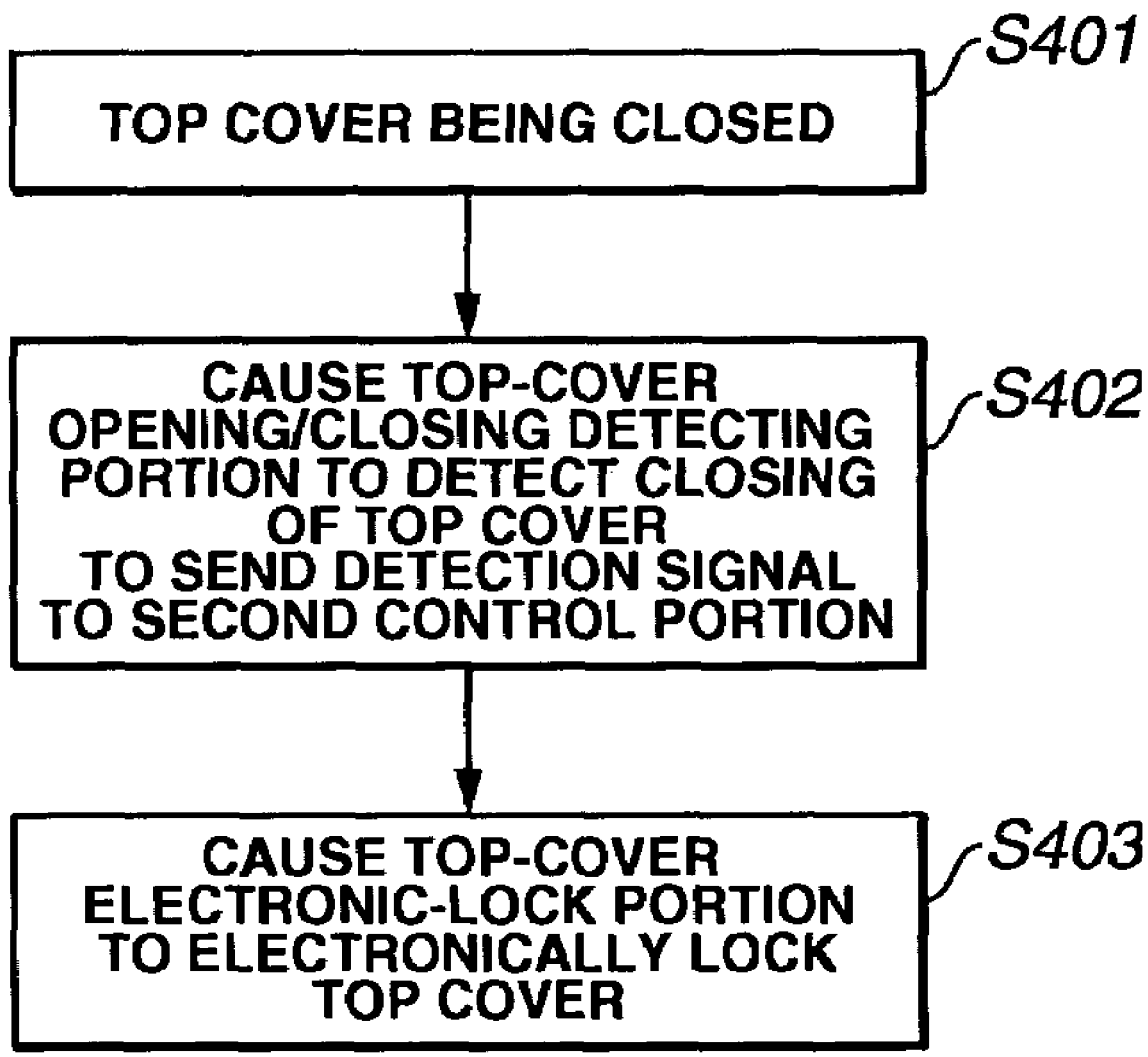
FIG. 4 is a flow chart illustrating a process performed by the second control portion if a top cover of the server apparatus shown in FIG. 2 has been closed.

Alternatively, the image forming apparatus 101 can be configured so that the top cover 1012 is automatically locked when it is closed, as shown in the flow chart of FIG. 4.

In FIG. 4, when the user closes the top cover 1012 (step S401), the top-cover opening/closing detecting portion 2032 detects such closure (step S402) and produces a detection signal, which is sent to the second control portion 202. The second control portion 202 receives the detection signal from the top-cover opening/closing detecting portion 2032 and causes the top-cover electronic-lock portion 2033 to lock the top cover 1012 (step S403).

Alternatively, the top cover 1012 can be automatically locked in response to the user inputting necessary information by means of the input portion 205.

Thus, configuring the top cover 1012 to automatically lock leads to the server apparatus 101 having improved security and operationality.

Furthermore, in addition to the above-mentioned cases, the server apparatus 101 addresses another security problem.

The second control portion 202 of the server apparatus 101 controls the locking and unlocking operations of the top-cover electronic-lock portion 2033 and the front-cover electronic-lock portion 2043. The power source that supplies power to the second control portion 202 derives from the power source for the server apparatus 101.

Therefore, in cases when supply of power from the AC power source is interrupted due to power failure or the like, power for the second control portion 202 is supplied from the secondary power source 207. Since power supply from the secondary power source 207 to the second control portion 202 is limited, the supply of power may be interrupted to not only the main body of the server apparatus 101 but also to the second control portion 202, which controls the electronic-lock portions 2033 and 2043.

Figure 5:
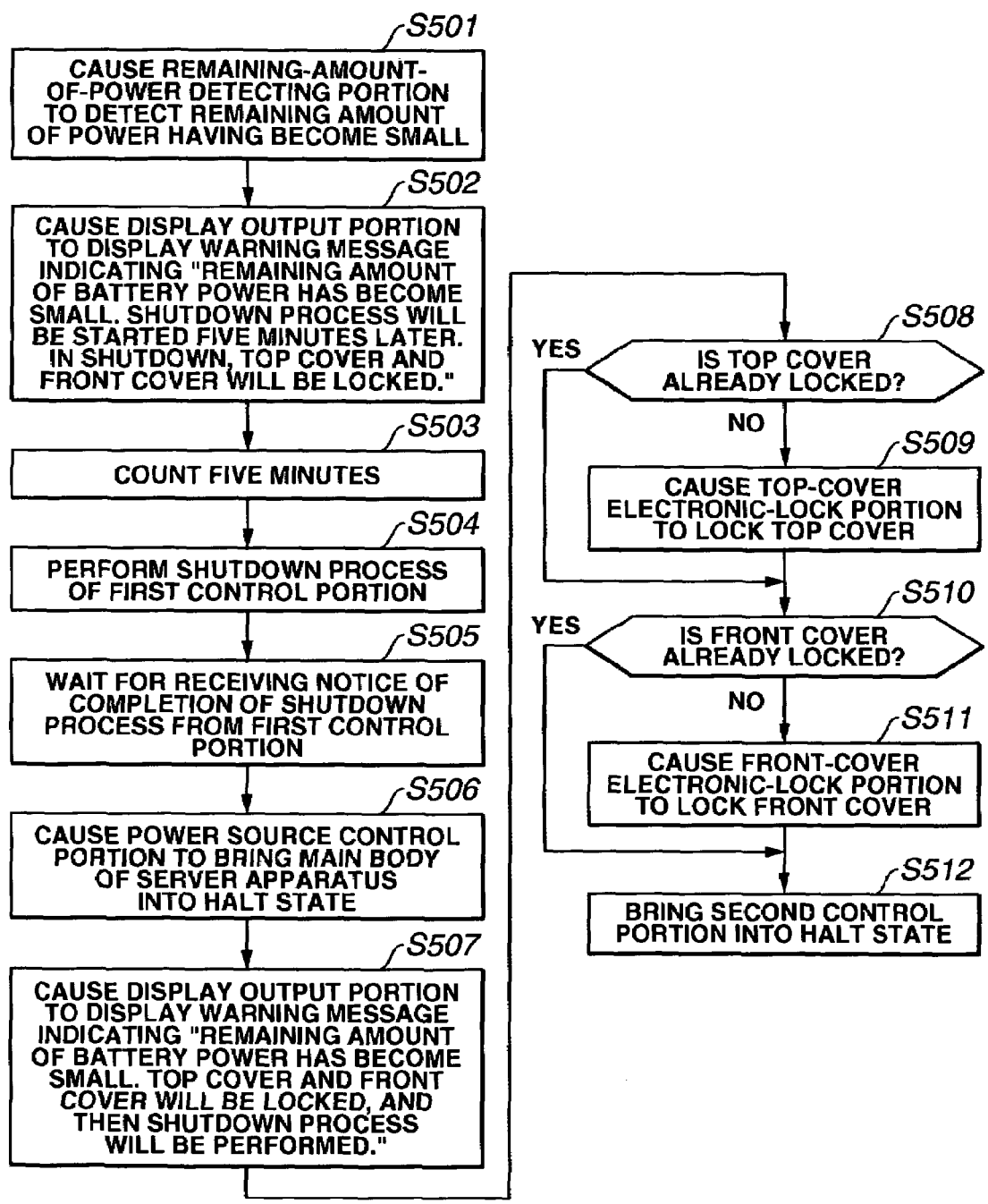
FIG. 5 is a flow chart illustrating a process by the server apparatus shown in FIG. 2 when a power level of a secondary power source is low.

FIG. 5 is a flow chart showing control operations performed on the top-cover electronic-lock portion 2033 and the front-cover electronic-lock portion 2043 when the power level of the secondary power source 207 is low such that the supply of power to the second control portion 202 is also interrupted.

When the server apparatus 101 cannot receive the supply of power from the AC power source due to power failure or the like, power from the secondary power source 207 is supplied to the main body of the server apparatus 101. The amount of power from the secondary power source 207 is limited, and unless the supply of power from the AC power source starts prior to power depletion from the secondary power source 207, the main body of the server apparatus 101 must perform an end process operation.

In FIG. 5, when the remaining amount of power of the secondary power source 207 is low, the remaining-amount-of-power detecting portion 2071 detects such small/low level and produces a detection signal, which is sent to the second control portion 202 (step S501). The second control portion 202 causes the display output portion 206 to display a warning in order to inform the user that the end process operation will start after a given period of time, for example, after five minutes (step S502). The warning display can read, for example, "Remaining Amount Of Battery Power Has Become Small. Shutdown Process Will Be Started Five Minutes Later. In Shutdown, Top Cover And Front Cover Will Be Locked." on the screen of the display output portion 206.

After the message has been displayed on the display output portion 206, the second control portion 202 counts a predetermined period of time (for example, five minutes) (step S503). If a charging operation from the AC power source is not started by the charging portion 2072 of the secondary power source 207 within the predetermined period of time, the second control portion 202 first performs a shutdown process operation on the first control portion 201 to turn off the supply of power to the server apparatus 101 (step S504).

After the shutdown process operation is completed in the step S504, the first control portion 201 gives notice of the completion of the shutdown processing operation to the second control portion 202 (step S505). Alternatively, the second control portion 202 may determine that the shutdown processing operation on the first control portion 201 is completed when detecting that a communication link between the first control portion 201 and the second control portion 202 is cut.

Next, the second control portion 202 causes the power source control portion 208 to bring the power source for the server apparatus 101 into a halt state (step S506). Then, the second control portion 202 causes the display output portion 206 to once again display a warning message indicating that the top cover and the front cover will be locked (step S507). The warning message may read "Remaining Amount Of Battery Power Has Become Small. Top Cover And Front Cover Will Be Locked, And Then Shutdown Process Will Be Performed." for example.

Next, the flow of control operations proceeds to locking operations of the top cover 1012 and the front cover 1011.

The second control portion 202 first reads information stored in the memory so as to determine if the top cover 1012 is already locked (step S508). If it is determined that the top cover 1012 is in an unlocked state, the second control portion 202 causes the top-cover electronic-lock portion 2033 to lock the top cover 1012 (step S509). After the top cover 1012 has been locked, or if it is determined in the step S508 that the top cover 1012 is in a locked state, the second control portion 202 reads information stored in the memory so as to determine if the front cover 1011 is already locked (step S510). If it is determined that the front cover 1011 is in an unlocked state, the second control portion 202 causes the front-cover electronic-lock portion 2043 to lock the front cover 1011 (step S511). After the front cover 1011 has been locked, or if it is determined in the step S510 that the front cover 1011 is in a locked state, the second control portion 202 starts its own ending process operation to bring its own power source into an off-state, thus resulting in a halt state (step S512).

As described above, if the supply of power to the second control portion 202, which controls the top-cover electronic-lock portion 2033 and the front-cover electronic-lock portion 2043, is interrupted, the top cover 1012 of the system bay 203 and the front cover 1011 of the data bay 204, in which storage media (removable media) are inserted, are locked. Accordingly, even if the power source for the server apparatus 101 is in an off-state, removing the storage media from the first storage device 2031 and the second storage device 2041 is prevented. Thus, the possibility that someone else may remove the storage medium from the first storage device 2031 or the second storage device 2041 without permission of the owner of the storage medium is minimized, thus ensuring more security.

It should be noted that if the user intends to bring the top cover 1012 into an unlocked state to take out a disk from the storage device 2031 or 2041, the user may input, via the input portion 205, a command for removing the disk. The second control portion 202 receives such a command and compares ID's and passwords input by the user with information stored in the first storage device 2031 or the second storage device 2041, thereby enabling removal of the disk.

Second Embodiment

Next, a second embodiment of the invention will be described with reference to FIGS. 6 to 9.

It should be noted that the system arrangement using a management server serving as an information processing apparatus according to the second embodiment is the same as that shown in FIG. 1, and, therefore, the second embodiment will be described also with reference to FIG. 1.

Figure 6:
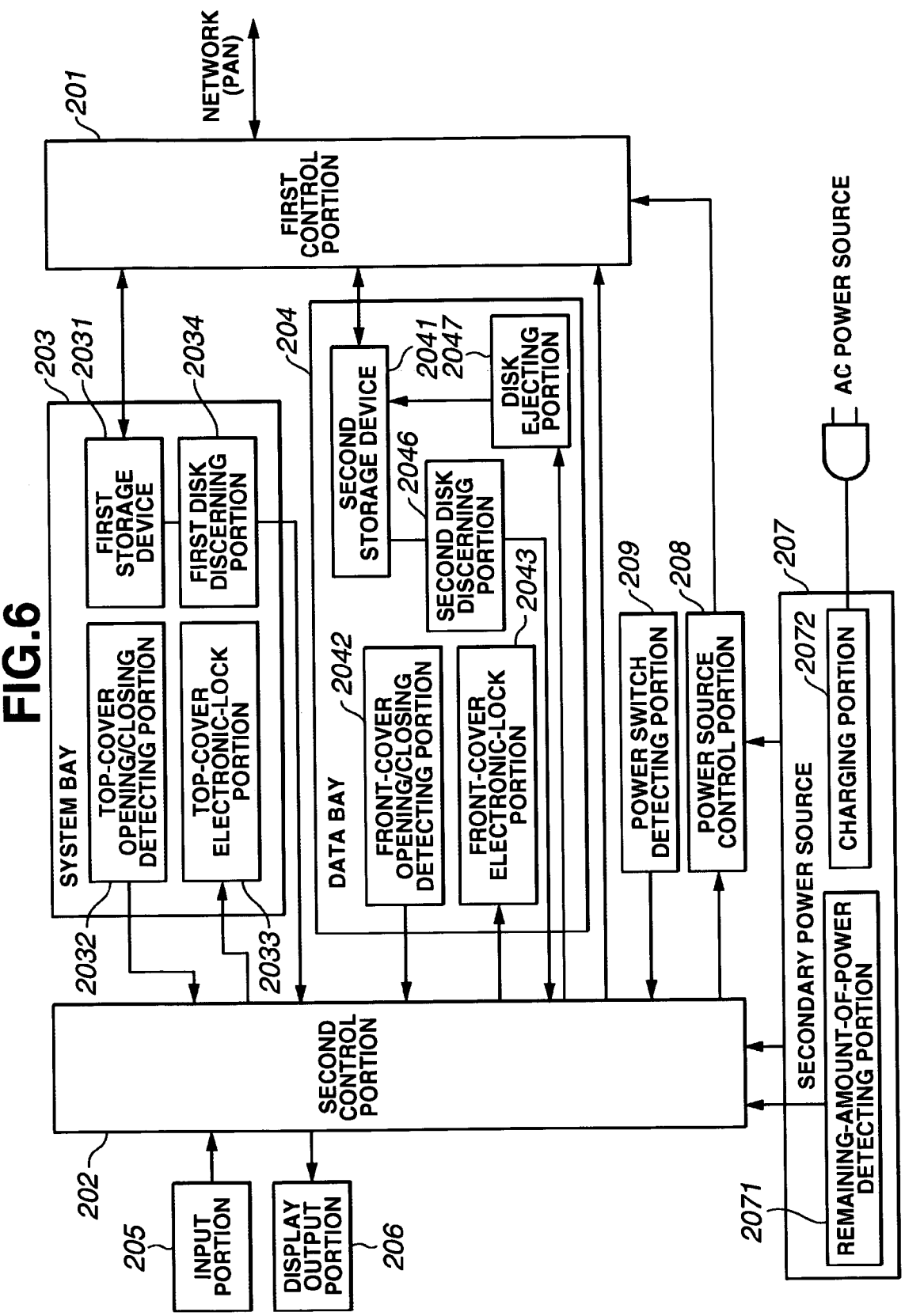
FIG. 6 is a block diagram of the components of a server apparatus according to a second embodiment of the invention.

FIG. 6 is a block diagram of a server apparatus 101 serving as the information processing apparatus according to the second embodiment. In FIG. 6, the same parts as those shown in FIG. 2 are denoted by like reference characters.

A point of difference between FIG. 6 and FIG. 2 lies in the structural arrangement of the system bay 203 and the data bay 204.

More specifically, the system bay 203 in the second embodiment includes a first storage device 2031, a top-cover opening/closing detecting portion 2032, a top-cover electronic-lock portion 2033 and a first storage-medium (disk) discerning portion 2034.

The data bay 204 in the second embodiment includes a second storage device 2041, a front-cover opening/closing detecting portion 2042, a front-cover electronic-lock portion 2043, a second storage-medium (disk) discerning portion 2046 and a storage-medium (disk) ejecting portion 2047 (the DVD drive 2044 and the CF card slot 2045 of the first embodiment not included in the second embodiment).

The first storage-medium discerning portion 2034 discerns whether a storage medium inserted in the first storage device 2031 is a removable hard disk in which an OS of the server apparatus 101 and application software are stored or a removable hard disk in which data is stored. A discernment signal produced by the first storage-medium discerning portion 2034 is transmitted to the second control portion 202.

The first storage-medium discerning portion 2034 can discern the kind of a storage medium by methods well known in the art, such as using interface pins of the hard disk. In a hard disk having an operating system stored therein, a fuse connected between a test pin and a ground pin is beforehand blown out with a high voltage applied thereto when the operating system is installed in the hard disk. As such, even if a test voltage is applied to the test pin, no electrical conduction occurs between the test pin and the ground pin. By detecting such absence of electrical conduction, it is possible to discern a system disk. On the other hand, in the case of a data disk, since the fuse is not blown out, there is electrical conduction if the test voltage is applied to a given test pin. By detecting such presence of electrical conduction, it is possible to discern a data disk.

Further, the second storage-medium discerning portion 2046 discerns whether a disk (storage medium) inserted in the second storage device 2041 is a systems disk or a data disk. A discernment signal produced by the second storage-medium discerning portion 2046 is transmitted to the second control portion 202. The second storage-medium discerning portion 2046 also employs the same discernment method as employed by the first storage-medium discerning portion 2034.

The storage-medium ejecting portion 2047 is configured to eject a disk (storage medium) inserted in the second storage device 2041. The storage-medium ejecting portion 2047 acts in response to a control signal from the second control portion 202. When a request for disk ejection is received from the input portion 205 operated by the user or from the first control portion 201 (for example, when receiving a request for disk ejection via the network 102), the second control portion 202 causes the storage-medium ejecting portion 2047 to eject the disk from the second storage device 2041 upon confirmation of the user identity by means of password authentication.

Next, a locking operation of the top-cover electronic-lock portion 2033, which is controlled by the second control portion 202, will be described with reference to the flow chart of FIG. 7.

Figure 7:
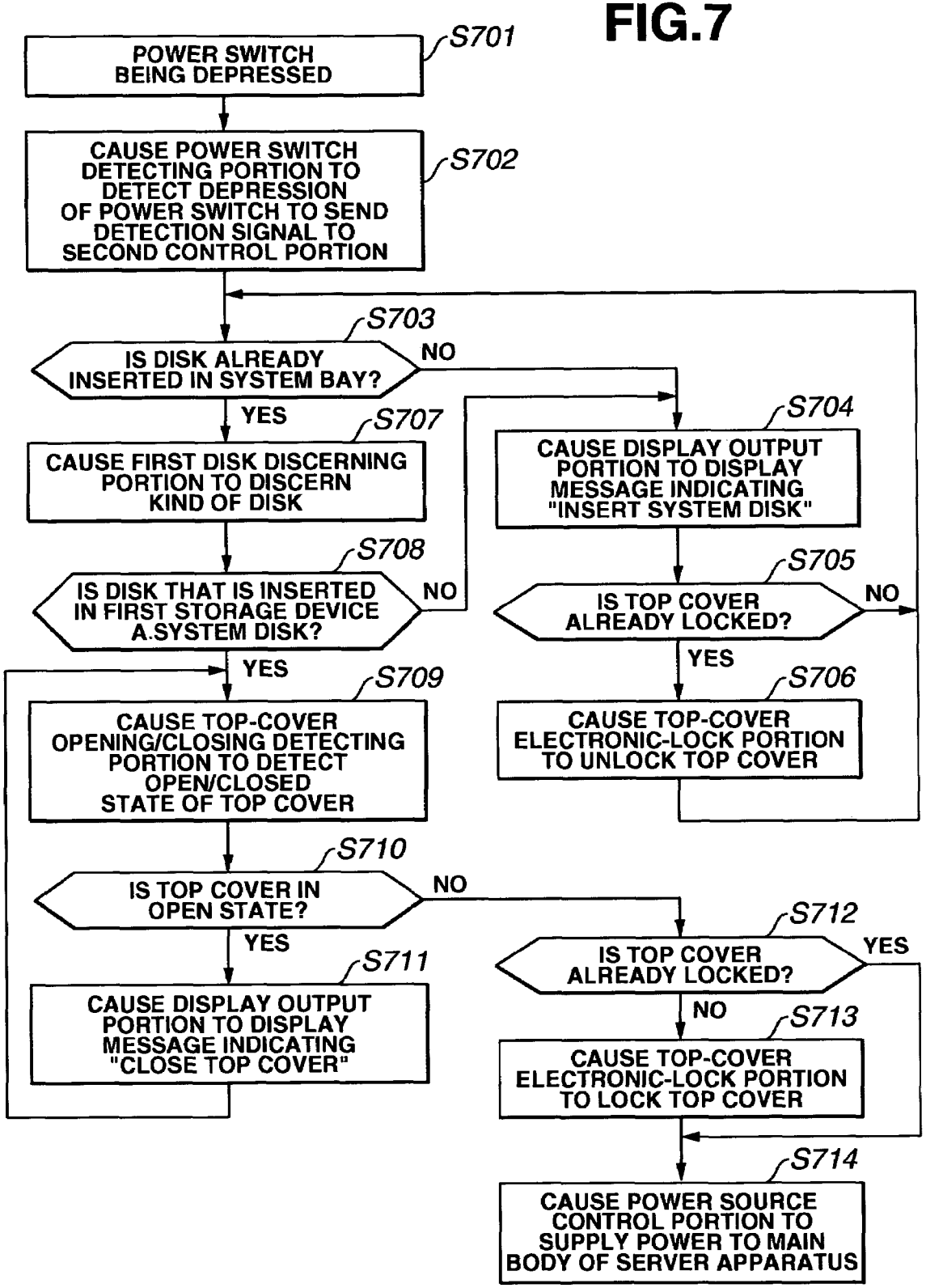
FIG. 7 is a flow chart illustrating a locking operation of a top-cover electronic-lock portion when a power source of the server apparatus shown in FIG. 7 is in an off-state.

The flow chart of FIG. 7 shows process operations performed by the second control portion 202 if the power switch of the server apparatus 101 has been depressed by the user and when a power source for supplying power to the server apparatus 101 is in an off-state.

In FIG. 7, when the power switch has been depressed by the user (step S701), the power switch detecting portion 209 detects such depression to produce a detection signal, which is sent to the second control portion 202 (step S702). The second control portion 202 receives the detection signal from the power switch detecting portion 209 through the use of an interrupt signal. The second control portion 202 causes the first storage-medium (disk) discerning portion 2034 to determine if a disk is already inserted in the first storage device 2031 (step S703). If no disk is inserted in the first storage device 2031, the server apparatus 101 cannot start operating because there is no operating system. The second control portion 202 causes the display output portion 206 to display a message requesting the user to insert a systems disk into the first storage device 2031 (step S704).

Next, the second control portion 202 reads information stored in the memory thereof so as to determine if the top cover is already locked (step S705). If the top cover is already locked, the second control portion 202 causes the top-cover electronic-lock portion 2033 to unlock the top cover (step S706).

Also, if it is determined in the step S705 that the top cover is in an unlocked state, or after the top cover has been unlocked in the step S706, the flow of processing operations returns to the step S703, continuing the processing operations again.

On the other hand, if it is determined in the step S703 that a disk is already inserted in the first storage device 2031 of the system bay 203, the second control portion 202 causes the first storage-medium discerning portion 2034 to discern the kind of disk inserted in the first storage device 2031 (step S707). If the disk inserted in the first storage device 2031 is a data disk (step S708), the second control portion 202 causes the display output portion 206 to display a message requesting the user to insert a systems disk into the first storage device 2031 (step S704).

If it is determined in the step S708 that the disk inserted in the first storage device 2031 of the system bay 203 is a systems disk, the second control portion 202 causes the top-cover opening/closing detecting portion 2032 to detect the open/closed state of the top cover 1012 (step S709). If the top cover 1012 is in an open state (step S710), the second control portion 202 causes the display output portion 206 to display a message indicating "Close Top Cover," or the like, thereby requesting the user to close the top cover 1012 (step S711).

After the user has closed the top cover 1012, or when it is determined in the step S710 that the top cover 1012 is in a closed state, the second control portion 202 reads information stored in the memory thereof so as to determine if the top cover 1012 is already locked (step S712). If the top cover 1012 is not yet locked (i.e., the top cover 1012 is in an unlocked state), the second control portion 202 causes the top-cover electronic-lock portion 2033 to lock the top cover 1012 (step S713). After the top cover 1012 has been locked, or if it is determined in the step S712 that the top cover 1012 is already locked, the second control portion 202 causes the power source control portion 208 to supply power to the main body of the server apparatus 101 (step S714).

As described above, when the user has depressed the power switch, the second control portion 202 determines if the disk inserted in the first storage device 2031 is a systems disk, and if so, the top-cover electronic-lock portion 2033 automatically locks the top cover 1012 so that it is unnecessary for the user to perform such locking operation.

Alternatively, the top-cover electronic-lock portion 2033 can automatically lock the top cover 1012 when the top cover 1012 is closed, as described in the first embodiment.

Further like the first embodiment, the top cover 1012 and the front cover 1011 can be automatically locked in response to the user inputting necessary information by means of the input portion 205.

Figure 8:
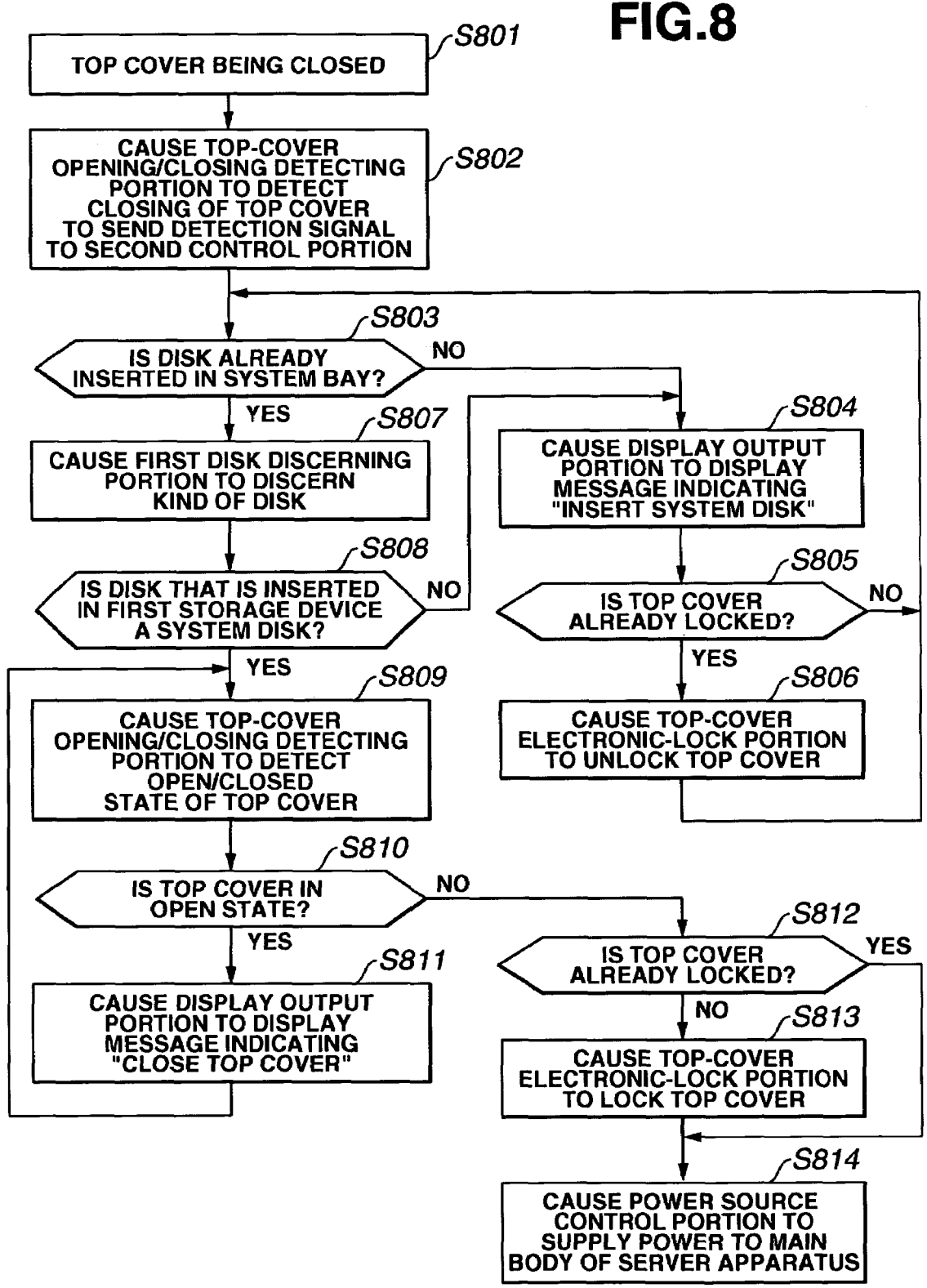
FIG. 8 is a flow chart illustrating a process operation to be performed by the second control portion if a top cover of the server apparatus shown in FIG. 7 has been closed.

FIG. 8 is a flow chart showing process operations performed in cases where the top cover 1012 is locked by the top-cover electronic-lock portion 2033 when the top cover 1012 is closed. In FIG. 8, steps S803 to S814 are the same as the above-mentioned steps S703 to S714 in FIG. 7, and, therefore, with the description thereof omitted, only processing operations unique to the process shown in FIG. 8 will be described.

In FIG. 8, when the user closes the top cover 1012 (step S801), the top-cover opening/closing detecting portion 2032 detects such closure to produce a detection signal, which is sent to the second control portion 202 (step S802). Then, the steps S803 to S814 are executed.

Figure 9:
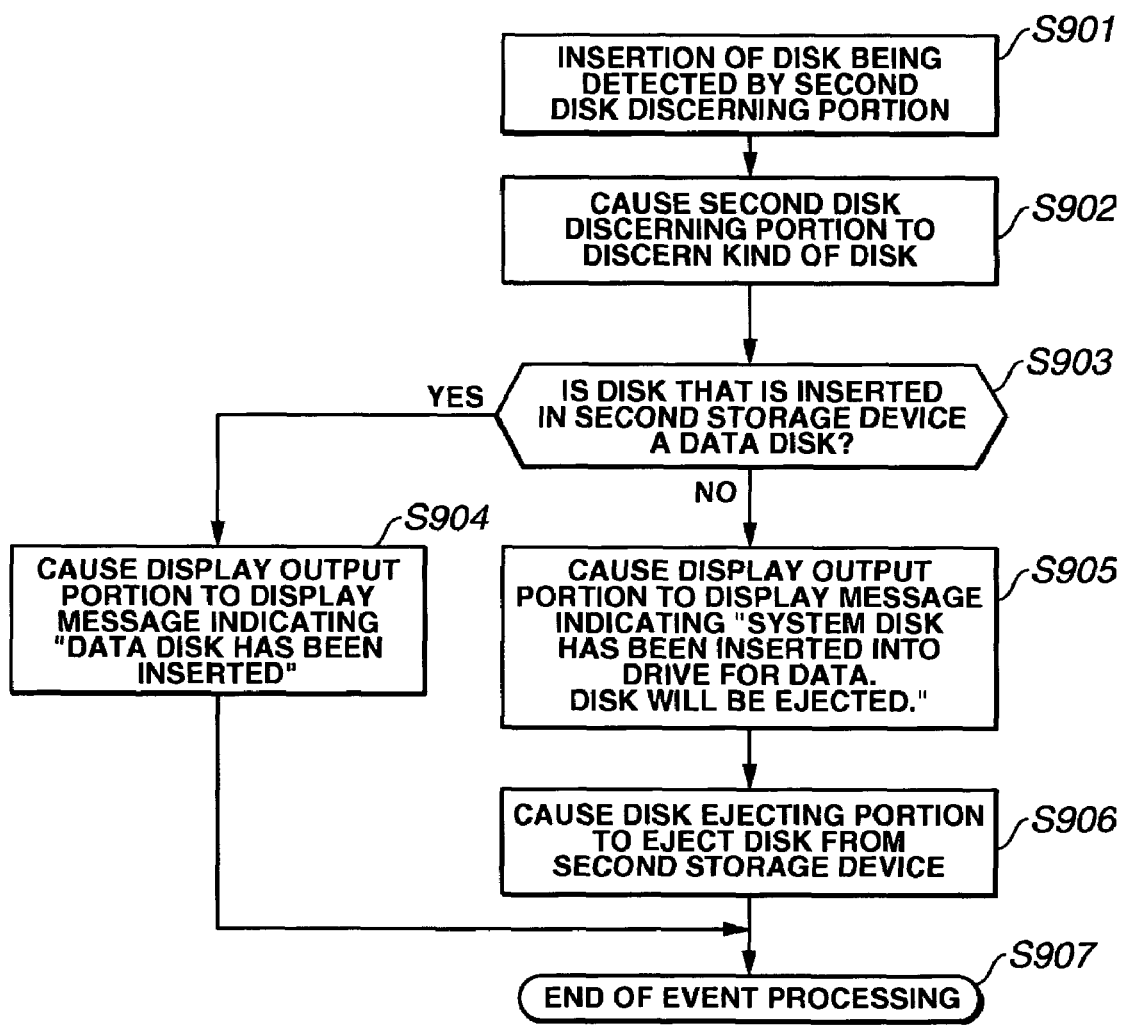
FIG. 9 is a flow chart illustrating a process performed when a disk has been mounted in a data bay of the server apparatus shown in FIG. 7.

Alternative to the process operation shown in FIG. 7 in which it is determined whether the disk inserted in the first storage device 2031 of the system bay 203 is a system disk or a data disk, and responsive thereto, the second control portion 202 controls the top-cover electronic-lock portion 2033, the data bay 204 may be controlled in a manner shown in the flow chart of FIG. 9 with the same functional block as that shown in FIG. 6 used.

In FIG. 7, in the data bay 204, the second storage-medium (disk) discerning portion 2046 detects insertion of a disk into the second storage device 2041 (step S901). Then, the second storage-medium discerning portion 2046 produces a detection signal, which is transmitted to the second control portion 202. The second control portion 202 causes the second storage-medium discerning portion 2046 to discern the type of disk inserted in the second storage device 2041 (step S902). If the disk inserted in the second storage device 2041 is a data disk (step S903), the second control portion 202 causes the display output portion 206 to display a message indicating "Data Disk Has Been Inserted" (step S904). The user can confirm that a data disk has been correctly inserted into the second storage device 2041 upon reading the message displayed on the display output portion 206.

If it is determined in the step S903 that the disk inserted in the second storage device 2041 is a system disk, the second control portion 202 causes the display output portion 206 to display a message indicating "System Disk Has Been Inserted Into Drive For Data. Disk Will Be Ejected." (step S905). The user is, therefore, informed that the system disk has been erroneously inserted into the drive for data (second storage device 2041). Next, the second control portion 202 causes the disk ejecting portion 2047 to eject the disk from the second storage device 2041 (step S906).

After completing steps S904 and S906, the process operation ends (step S907).

The above-described control operation prevents a system disk from being erroneously inserted into the second storage device 2041 of the data bay 204, which may lead to data being overwritten on the system disk or data stored therein being broken down.

In summary, since the top cover 1012 and the front cover 1011 are locked automatically, a server apparatus having improved security and operationality is realized.

Also, since the top cover 1012 and the front cover 1011 are locked after determining disk type, the user is not required, after becoming aware of an erroneous disk insertion, to unlock the cover, replace the wrong disk with the correct disk, and lock the covers again. Thus, a server apparatus having improved operationality is realized.

Further, since the cover automatically locks when in the closed state, failure of the user to lock the cover is minimized. Thus, a server apparatus having improved security and operationality in handling storage media is realized.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention.

What is claimed is:

1. An apparatus comprising:
    a storage device capable of supporting a storage medium therein;
    a lock selectively locking the storage medium within the storage device;
    a controller operatively coupled to the lock; and
    a discerner detecting type of storage medium supported within the storage device,
    wherein the controller, responsive to the discerner detecting a correct type of storage medium supported within the storage device, controls the lock to lock the storage medium within the storage device.

2. The apparatus of claim 1, further comprising:
    a power source supplying power to the apparatus;
    a power switch selectively switching the power source on or off; and
    wherein responsive to the power switch switching the power source on, the controller controls the lock to lock the storage medium within the storage device.

3. The apparatus of claim 2, further comprising a power detector detecting the power switch switching the power source on, and sending a detection signal to the controller, wherein responsive to receiving the detection signal, the controller controls the lock to lock the storage medium within the storage device.

4. The apparatus of claim 1, further comprising:
    a cover having an open state and a close state covering the storage device;
    the lock coupled to the cover; and
    wherein the controller controls the lock to automatically lock the cover responsive to the cover being in the closed state.

5. The apparatus of claim 4, further comprising a cover detector detecting whether the cover is in the open state or the close state; wherein the cover detector sends a close signal responsive to the cover being in the close state; and wherein responsive to the close signal, the controller controls the lock to lock the cover.

6. The apparatus of claim 1, further comprising:
    a power source having a power level supplying power to the apparatus;
    a power detector detecting the power level; and
    wherein responsive to the detector detecting the power level being less than a predetermined power level, the controller controls the lock to lock the storage medium within the storage device.

7. The apparatus of claim 4, further comprising:
    a power source having a power level supplying power to the apparatus;
    a power detector detecting the power level; and
    wherein responsive to the detector detecting the power level being less than a predetermined power level, the controller controls the lock to lock the cover in the closed state.

8. The apparatus of claim 1, wherein responsive to the discerner detecting a wrong type of storage medium, the controller controls the lock to unlock the cover.

9. A method for operating an image processing apparatus having a storage device supporting a storage medium therein, a cover selectively covering the storage device, and a power supply, the method comprising the following steps:

determining whether the power supply to the apparatus is being turned on;

responsive to determining that the power supply is being turned on, determining whether the cover is open or closed;

responsive to determining that the cover is closed, automatically locking the cover, determining type of storage medium inserted within the storage device; and responsive to determining the type being a correct type, locking the cover closed.

10. The method of claim 9, wherein the step of automatically locking the cover includes determining whether the cover is locked or unlocked, and if unlocked, locking the cover.

11. The method of claim 10, further comprising responsive to determining that the cover is open, displaying a message to close the cover.

12. The method of claim 9, further comprising the following steps:

detecting a power level of the power supply; and automatically locking the cover closed responsive to detecting the power level lower than a predetermined level.

13. The method of claim 12, further comprising before the step of automatically locking the cover closed, determining whether the cover is already locked or unlocked, and if unlocked, automatically locking the cover closed.

14. The method of claim 9, further comprising before the step of locking the cover closed:

determining whether the cover is open or closed;

if the cover is open, prompting closure of the cover;

determining whether the cover is locked or unlocked; and if the cover is unlocked, locking the cover.

15. The method of claim 9, further comprising responsive to determining the type of storage medium being an incorrect type, prompting insertion of a correct type of storage medium;

determining whether the cover is locked or unlocked; and if the cover is locked, unlocking the cover.

\* \* \* \* \*